United States Patent
Sarh et al.

(10) Patent No.: US 8,925,185 B2
(45) Date of Patent: Jan. 6, 2015

(54) ROBOT HAVING OBSTACLE AVOIDANCE MECHANISM

(71) Applicants: Branko Sarh, Huntington Beach, CA (US); Haruhiko Harry Asada, Lincoln, MA (US); Geoffrey Ian Karasic, Bedford, MA (US)

(72) Inventors: Branko Sarh, Huntington Beach, CA (US); Haruhiko Harry Asada, Lincoln, MA (US); Geoffrey Ian Karasic, Bedford, MA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/936,125

(22) Filed: Jul. 5, 2013

(65) Prior Publication Data

US 2013/0297070 A1 Nov. 7, 2013

Related U.S. Application Data

(62) Division of application No. 13/214,143, filed on Aug. 19, 2011, now Pat. No. 8,544,163.

(60) Provisional application No. 61/481,165, filed on Apr. 30, 2011.

(51) Int. Cl.
*B21J 15/02* (2006.01)
*B25J 9/16* (2006.01)
*B25J 5/00* (2006.01)
*B25J 18/06* (2006.01)
*B25J 9/00* (2006.01)

(52) U.S. Cl.
CPC ...... *B25J 9/1676* (2013.01); *B25J 5/00* (2013.01); *B25J 18/06* (2013.01); *B25J 9/0084* (2013.01); *Y10S 901/10* (2013.01)
USPC .............................. 29/719; 29/34 B; 901/10

(58) Field of Classification Search
USPC ........ 29/407.1, 525.06, 714, 719, 34 B, 26 A, 29/26 B; 901/10, 46, 47; 198/619, 468.5, 198/472.1
See application file for complete search history.

(56) References Cited

U.S. PATENT DOCUMENTS

| | | | |
|---|---|---|---|
| 5,865,661 A * | 2/1999 | Cyrus et al. | 446/136 |
| RE41,760 E * | 9/2010 | Thompson et al. | 198/619 |
| 7,934,575 B2 * | 5/2011 | Waibel et al. | 180/167 |
| 8,019,472 B2 * | 9/2011 | Montero SanJuan et al. | 700/245 |
| 8,151,912 B2 * | 4/2012 | Koide et al. | 180/7.1 |
| 8,522,905 B2 * | 9/2013 | Lama | 180/167 |
| 8,534,395 B2 * | 9/2013 | Niederberger | 180/8.6 |

* cited by examiner

*Primary Examiner* — David Bryant
*Assistant Examiner* — Jason L Vaughan
(74) *Attorney, Agent, or Firm* — Hugh P. Gortler

(57) ABSTRACT

A system includes a driver robot having a body with a pair of spaced apart flux conductors, and a follower robot having an articulated body with a pair of spaced apart magnets. The magnets are coupled to the flux conductors when the articulated body is in an engaged position. One of the magnets is decoupled from one of the flux conductors when the articulated body is in a flipping or stepping position.

18 Claims, 9 Drawing Sheets

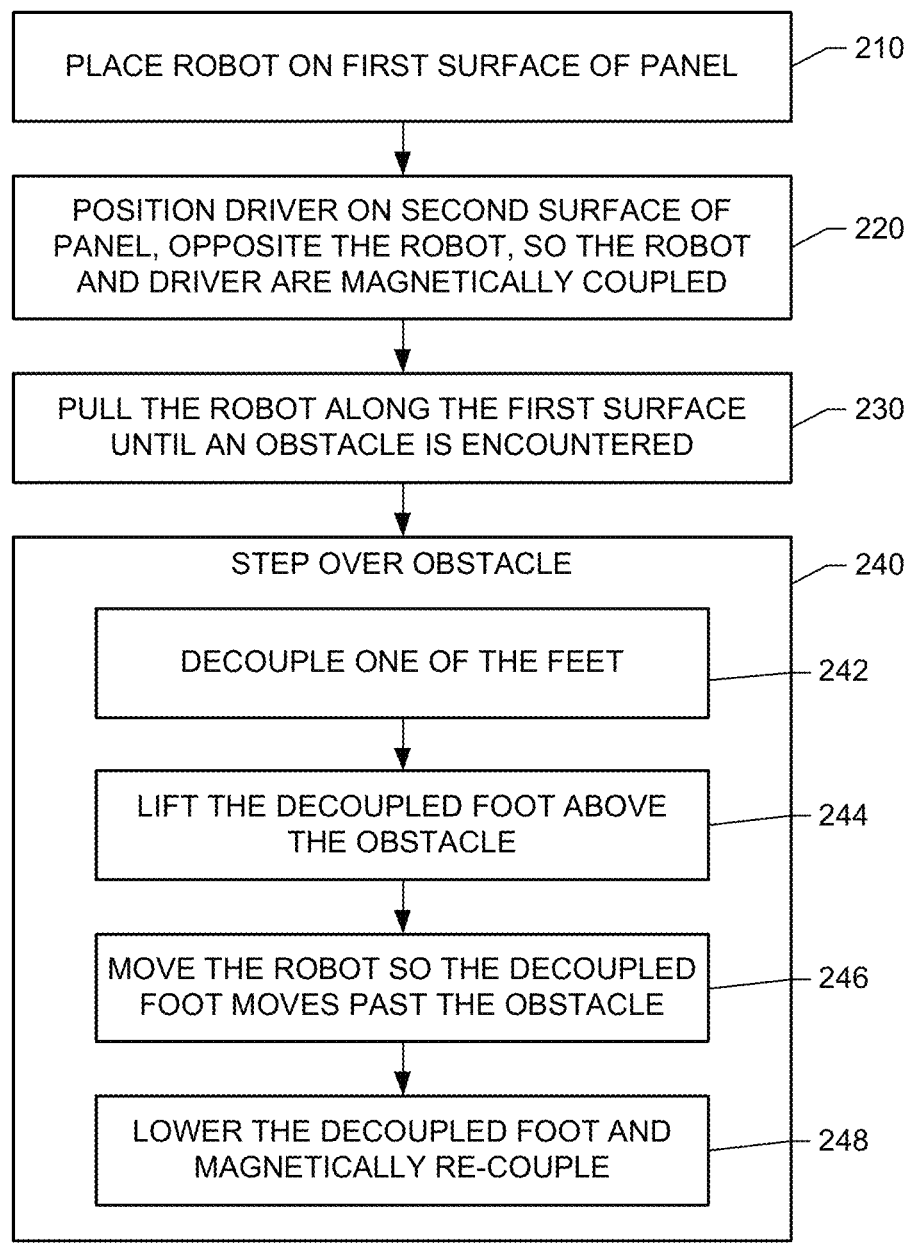

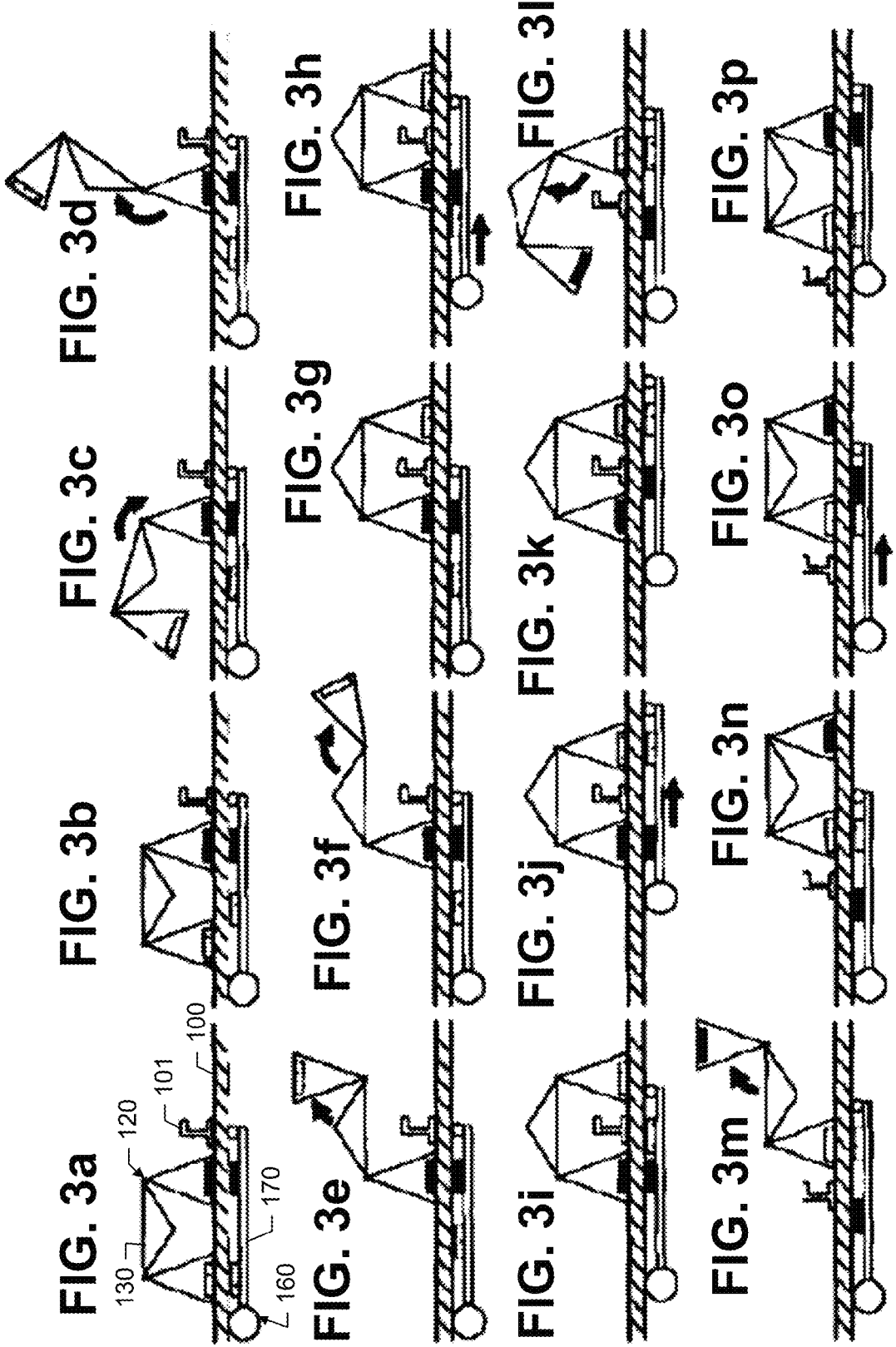

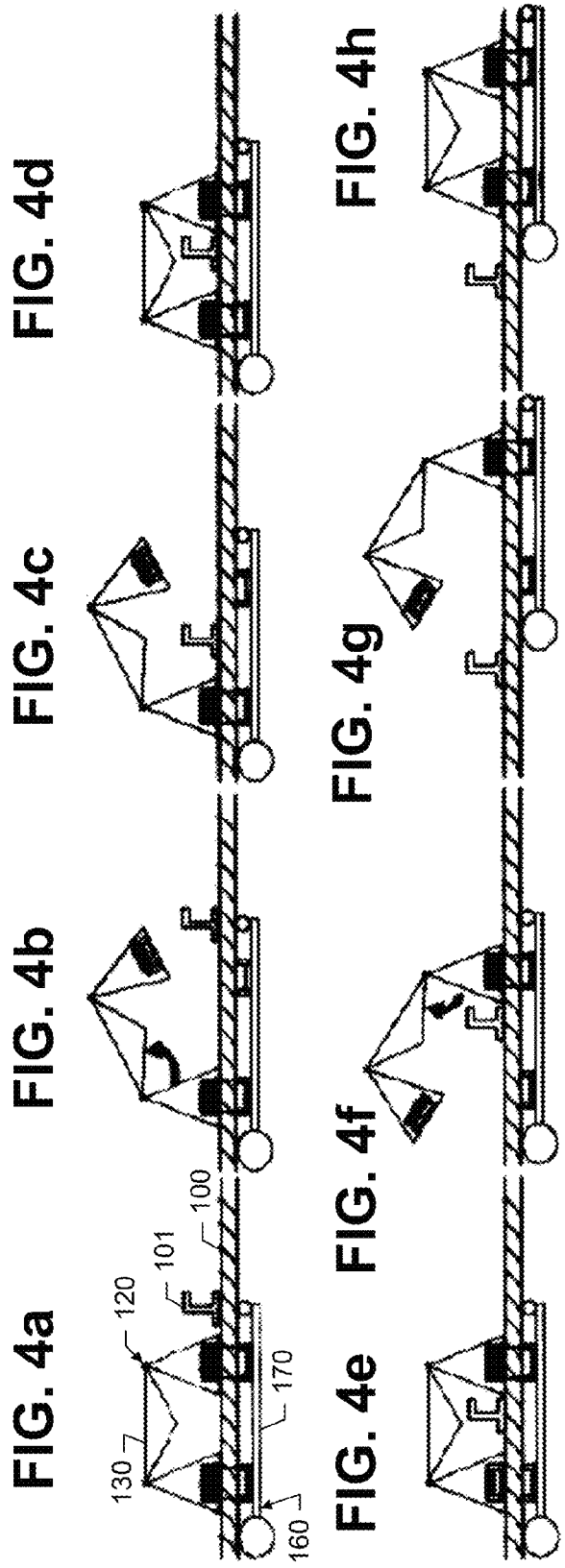

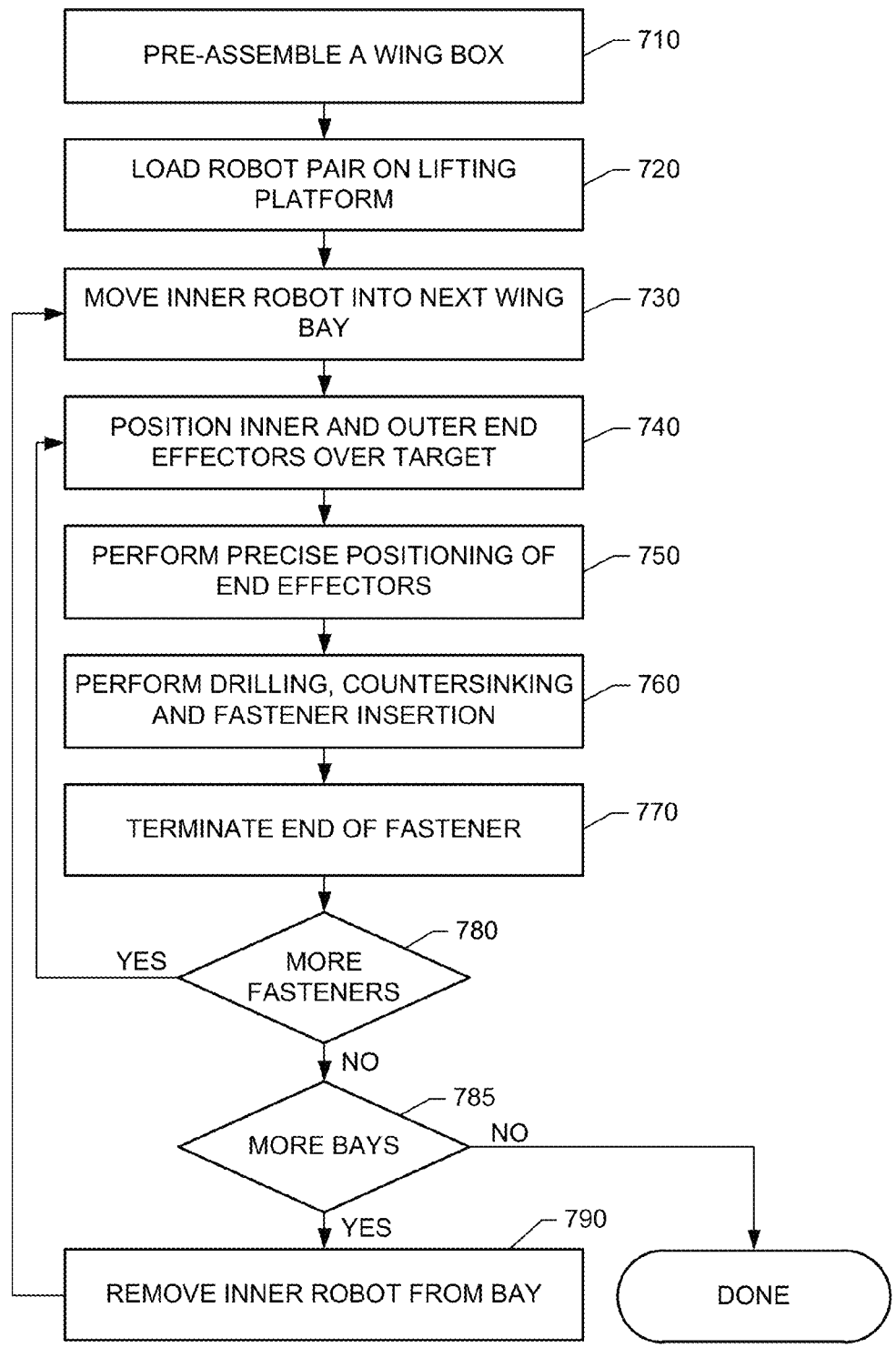

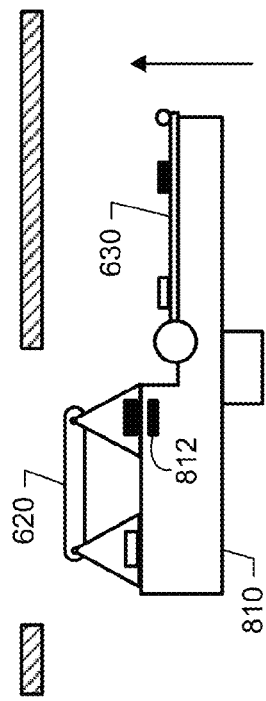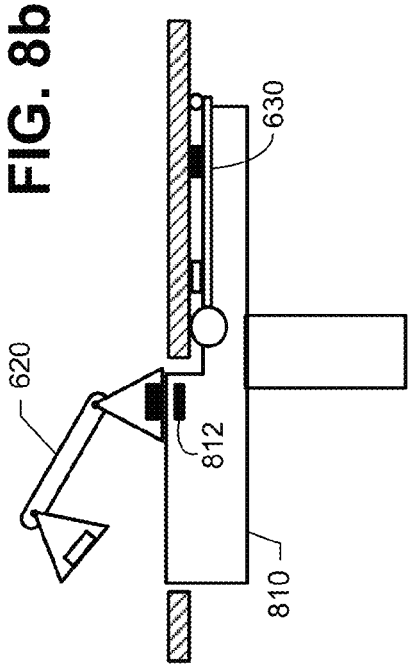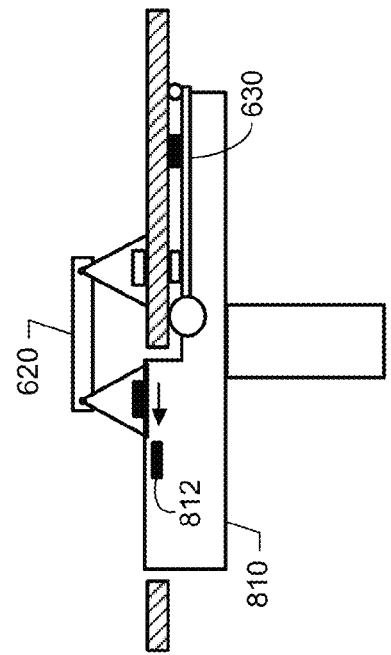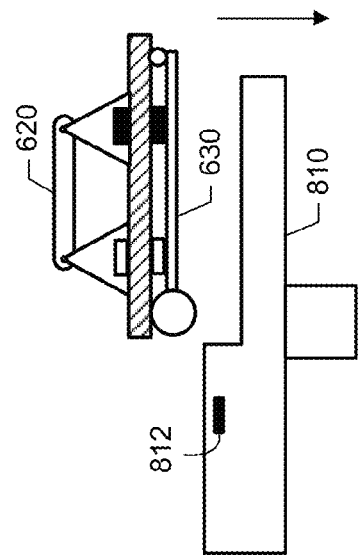

ROBOT HAVING OBSTACLE AVOIDANCE MECHANISM

This is a divisional of U.S. Ser. No. 13/214,143 filed 19 Aug. 2011, now, U.S. Pat. No. 8,544,163. U.S. Ser. No. 13/214,143 claims the benefit of priority of provisional application 61/481,165 filed Apr. 30, 2011, which is incorporated herein by reference.

BACKGROUND

During assembly of an aircraft, fastening operations are performed synchronously on opposite sides of various structures. A fastening operation may include drilling, countersinking and fastener insertion on one side of a structure, and terminating the end of each inserted fastener on the opposite side of the structure.

Consider fastening operations on a wing box of an aircraft. Drilling, countersinking and fastener insertion are performed by a robotic system outside the wing box. Sleeve and nut placement are performed inside the wing box by manual labor. A person enters a wing box through a small access port, and performs the sleeve and nut placement with hand tools while lying flat inside the wing box. On the order of several hundred thousand fasteners are installed and terminated on common aircraft wings.

It would be highly desirable to eliminate the manual labor and fully automate the fastening operations on both sides of the wing box. However, while placing a nut over the threads of a bolt might be a simple task for a human, it is not so simple for a robot. Precise positioning and orientation of a nut over a bolt is a complex task.

This task becomes even more complex due to space constraints inside the wing box. The wing box forms a narrow space that, at the tip, is only several inches high (see FIG. 5 for an example of a wing box). Moreover, the narrow space is accessible only through an access port. The robot has to enter the narrow space via the access port, navigate past stringers inside the narrow space, locate ends of inserted fasteners, and position an end effector and place a sleeve and nut over each fastener end.

The task becomes even more complex because aircraft tolerances are extremely tight. The task becomes even more complex because the end effector typically weighs 40 to 50 pounds. The task becomes even more complex because the robot inside the narrow space has to synchronize its tasks with those of the robotic system outside the wing box.

SUMMARY

According to an embodiment herein, a system includes a driver robot having a body with a pair of spaced apart flux conductors, and a follower robot having an articulated body with a pair of spaced apart magnets. The magnets are coupled to the flux conductors when the articulated body is in an engaged position. One of the magnets is decoupled from one of the flux conductors when the articulated body is in a flipping or stepping position.

BRIEF DESCRIPTION OF THE DRAWINGS

FIG. 2 is an illustration of a general method of moving the robot to avoid an obstacle on a surface of a panel.

FIGS. 3a to 3p are illustrations of a particular method of moving the robot to avoid an obstacle on a surface of a panel.

FIGS. 4a to 4h are illustrations of another particular method of moving the robot to avoid an obstacle on a on a surface of a panel.

FIG. 7 is an illustration of a method of manufacturing an aircraft wing box.

FIGS. 8a-8d are illustrations of a method of loading an inner robot into a wing box.

DETAILED DESCRIPTION

Figure 1A:
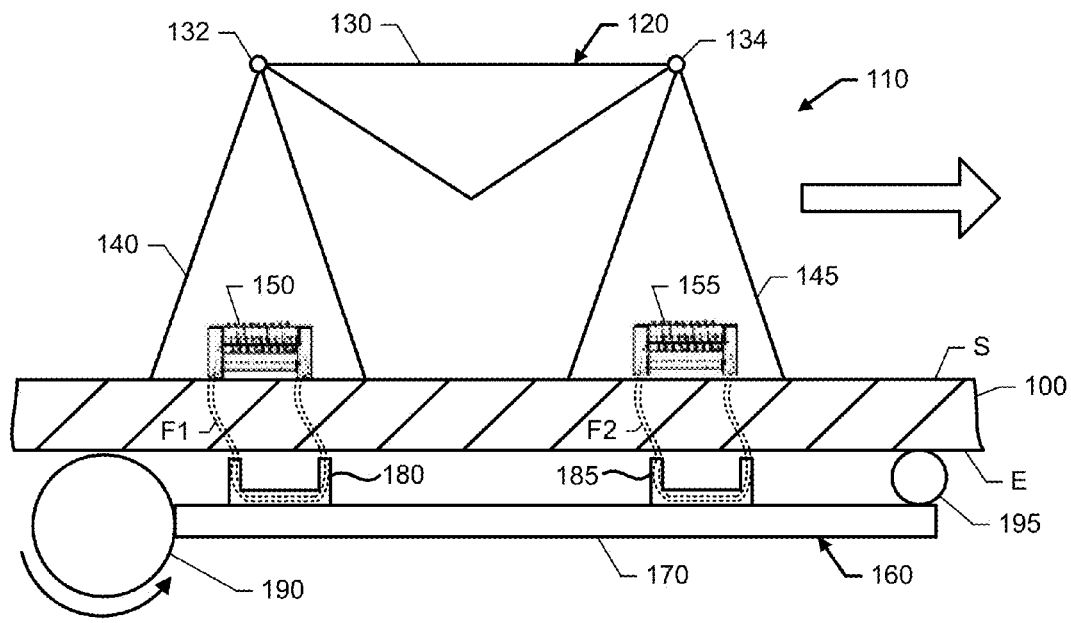
FIG. 1a is an illustration of system including a robot and a flux conducting device.

FIG. 1a illustrates a system 110 including a robot 120 for moving along a first surface (S) of a non-magnetic panel 100 (e.g., a panel 100 made of aluminum or a composite). The robot 120 includes a body 130, and first and second feet 140 and 145 connected to the body 130 via revolute joints 132 and 134. The feet 140 and 145 may be pivoted about the revolute joints 132 and 134. Actuators (not shown) may be used to move the body 130, or the feet 140 and 145, or both. At very least, each foot 140 and 145 may be individually lifted off and raised above the first surface (S).

A first magnet 150 is located at the base of the first foot 140, and a second magnet 155 is located at the base of the second foot 145. The magnets 150 and 155 may be permanent magnets or electromagnets. Permanent magnets are preferred because they provide sufficient force in a lightweight compact package, and they don't require power.

Figure 1B:
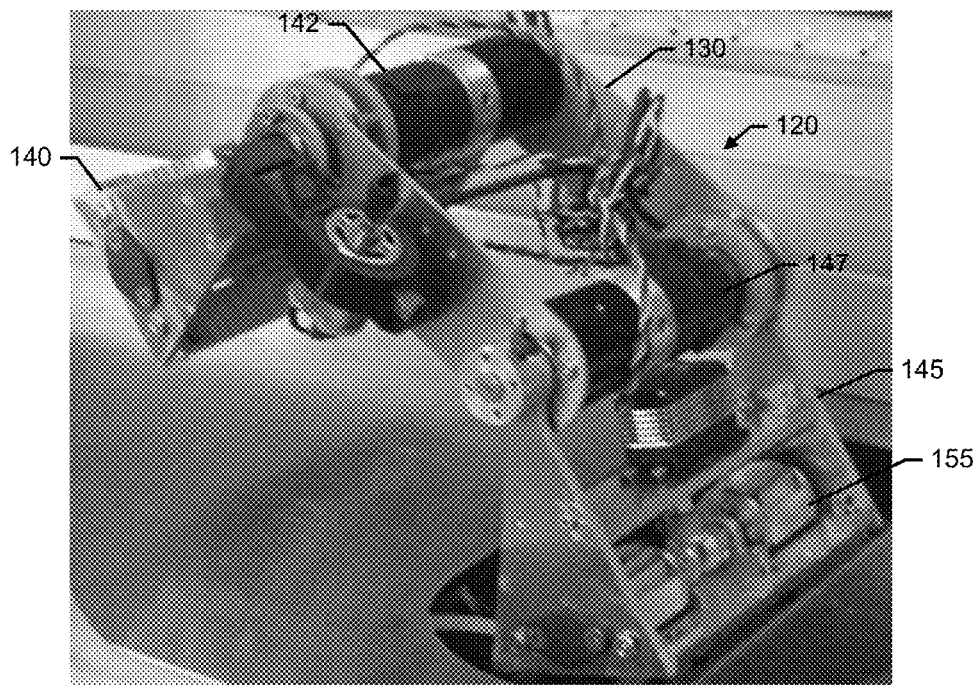
FIG. 1b is a photograph of a robot that was actually reduced to practice.

FIG. 1b shows a robot 120 that was actually reduced to practice. The actuators are referenced by numerals 142 and 147.

Returning to FIG. 1a, the system 110 further includes a driver 160 positioned along a second surface (E) of the panel 100, opposite the robot 120. The driver 160 includes a chassis 170 and first and second flux conductors 180 and 185 mounted to the chassis 170. The flux conductors 180 and 185 may be aligned with the first and second magnets 150 and 155. To align the first flux conductor 180 with the first magnet 150, projections on the flux conductor 180 are aligned with projections on the first magnet 150. These aligned projections form an air gap (across the panel 100) and define a minimum reluctance position for magnetic flux (F1). Deviation from that aligned position (as illustrated in FIG. 1) will increase the reluctance. Thus, movement of the first flux conductor 185 out of alignment will be resisted. Conversely, when the first flux conductor 180 is moved towards the first magnet 150, they will be forced into alignment in order to reduce the reluctance. The second flux conductor 185 and the second magnet 155 define a minimum reluctance position for magnetic flux (F2) and interact in the same manner.

In this manner, the robot 120 and the driver 160 are magnetically attracted through the panel 100. When the first flux conductor 180 or the second flux conductor 185 or both flux conductors 180 and 185 are aligned with the magnets 150 or 155, the robot 120 is clamped against the first surface (S) of the panel 100 and the driver 160 is clamped against the second surface (E) of the panel 100.

The driver 160 further includes a system for moving the driver 160 along the exterior surface (E) of the panel 100. For example, the system may be a traction system including a wheel 190 driven by an electric motor (not shown), and a passive wheel 195.

When the magnets 150 and 155 are aligned with their corresponding flux conductors 180 and 185, the driver 160 is magnetically clamped to the robot 120. When the driver 160 moves along the second surface (E) of the panel 100, the robot 120 is pulled along the first surface (S). The magnets 150 and 155 have sufficient strength to pull the driver 160 against the exterior surface (E) of the panel 100 to create traction between the driven wheels 190 and the exterior surface (E).

The magnets 150 and 155 also have sufficient strength to hold the driver 160 against second surface (E). Consequently, the driver 160 may be supported against gravity without any external scaffolding or other support.

In some embodiments, each foot 140 and 145 is raised with sufficient power to overcome the magnetic coupling and pull its magnet 150 or 155 away from its corresponding flux conductor 180 or 185. In other embodiments, the two flux conductors 180 and 185 can slide on prismatic joints on the base 170 to engage and disengage the magnets 150 and 155.

During operation, the robot 120 can avoid obstacles on the first surface (S). FIG. 2 illustrates a general method of moving the robot 120 to avoid an obstacle. The robot 120 avoids the obstacles while holding the driver 160 against gravity.

Additional reference is made to FIG. 2. At block 210, the robot 120 is placed on the first surface (S) of the panel 100. At block 220, the driver 160 is positioned on the second surface (E) of the panel 100, opposite the robot 120, with each foot 140 and 145 magnetically coupled to its corresponding flux conductor 180 and 185. Thus, the driver 160 is magnetically clamped to the robot 120.

At block 230, the driver 160 moves along the second surface (E) of the panel 100. Since the robot 120 is magnetically coupled to the driver 160, the robot 120 is pulled along the first surface (S) and stays aligned with the driver 160. The robot 120 is moved until an obstacle is encountered. The robot 120 may use sensors to detect obstacles, or it may use pre-programmed data that identifies the locations of obstacles.

At block 240, the robot 120 steps over the obstacle. This stepping function may include decoupling one of the feet 140 or 145 from its flux conductor 180 or 185 (block 242), lifting the decoupled foot 140 or 145 above the obstacle (block 244), and moving the robot 120 so the decoupled foot 140 or 145 moves past the obstacle (block 246). The decoupled foot 140 or 145 may then be lowered back onto the first surface (S) after the obstacle has been stepped over, and then magnetically re-coupled with a flux conductor 180 or 185 (block 248).

Reference is now made to FIG. 3a-3p, which illustrate a particular method by which the robot 120 can avoid obstacles 101 on a panel 100. When the robot 120 reaches the obstacle, one foot (its "near" foot) is closer to the obstacle 101 than the other foot (its "far" foot). The robot 120 steps over the obstacle 101 by decoupling the far foot, and flipping the body 130 so the far foot is lifted above the obstacle and crosses over the obstacle 101.

For example, when the robot 120 encounters the obstacle 101 (FIG. 3a), the far foot is magnetically decoupled by sliding away (misaligning) its flux conductor (FIG. 3b), the body 130 is flipped so that the robot 120 straddles the obstacle 101 (FIGS. 3c to 3e), and the decoupled foot is lowered (FIGS. 3f and 3g). All along, the driver 160 remains clamped to the robot 120 by the magnetic coupling between the near foot and its flux conductor.

The decoupled flux conductor is then slid along the chassis 170 of the driver 160 until it displaces the other flux conductor (FIGS. 3h and 3i). The flux conductors may be mounted to the chassis 170 via prismatic joints in offset planes that allow the flux conductors to pass each other without interference. This permits the flux conductors to move independently of the chassis 170. In this manner, the driver 160 remains clamped to the robot 120 even as the one flux conductor is being displaced with the other flux conductor. The displaced flux conductor is then slid forward until it is magnetically coupled with the forward foot (FIG. 3j).

The remaining steps (FIGS. 3l to 3p) mimic the initial flipping of the robot over the obstacle. In this manner, the robot 120 moves from one side of the obstacle (FIG. 3a) to the other side of the obstacle (FIG. 3p).

Reference is now made to FIG. 4a-4h, which illustrate another particular method by which the robot 120 can avoid obstacles. When the robot 120 encounters an obstacle 101 on the panel 100, the foot nearest the obstacle is decoupled and lifted above the obstacle 101. The robot 120 is then moved so the decoupled foot moves past the obstacle 101.

For example, when the robot 120 encounters the obstacle 101 (FIG. 4a), the foot nearest the obstacle 101 is lifted away from its flux conductor (thereby decoupling it from its flux conductor) and raised above the obstacle 101 (FIG. 4b). The robot 120 is pulled forward until the raised foot moves past the obstacle 101 (FIG. 4c). The raised foot is then lowered and recoupled with its flux conductor (FIG. 4d). At this point, the robot 120 is straddling the obstacle 101. The remaining steps (FIGS. 4e to 4h) mimic the initial stepping over the obstacle 101. Throughout this process, the driver 160 remains magnetically coupled to the robot 120.

A system herein is not limited to the robot 120 and driver 160 described above. In some embodiments, joints having several degrees of freedom may be used instead of the revolute joints 132 and 134, and more complex linkages than the feet 140 and 145 may be used. In some embodiments, a flux conducting device may include magnets instead of the flux conductors 180 and 185. In some embodiments, the driver 160 may be replaced by a gantry or other system for moving the flux conducting device along the exterior surface of the panel 100.

A system herein is not limited to any particular application. However, one application of special interest to the applicants is manufacturing operations on aircraft structures. One such structure is a wing box.

Figure 5:
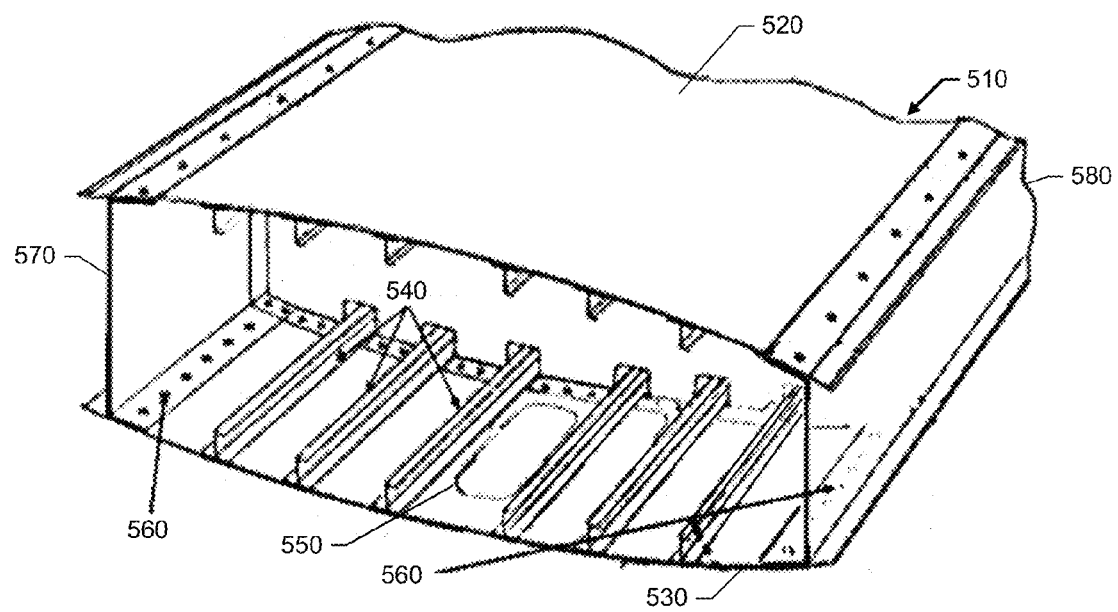
FIG. 5 is an illustration of an aircraft wing box.

Reference is now made to FIG. 5, which illustrates a wing bay 510 of a wing box (the wing box has a plurality of wing bays 510). The wing bay 510 includes top and bottom skin panels 520 and 530 and stringers 540 extending across the skin panels 520 and 530. An access port 550 is located in the bottom skin panel 530. The access port 550 leads to a confined interior space. Fasteners 560 attach ribs 570 and 580 to the top and bottom skin panels 520 and 530.

Figure 6:
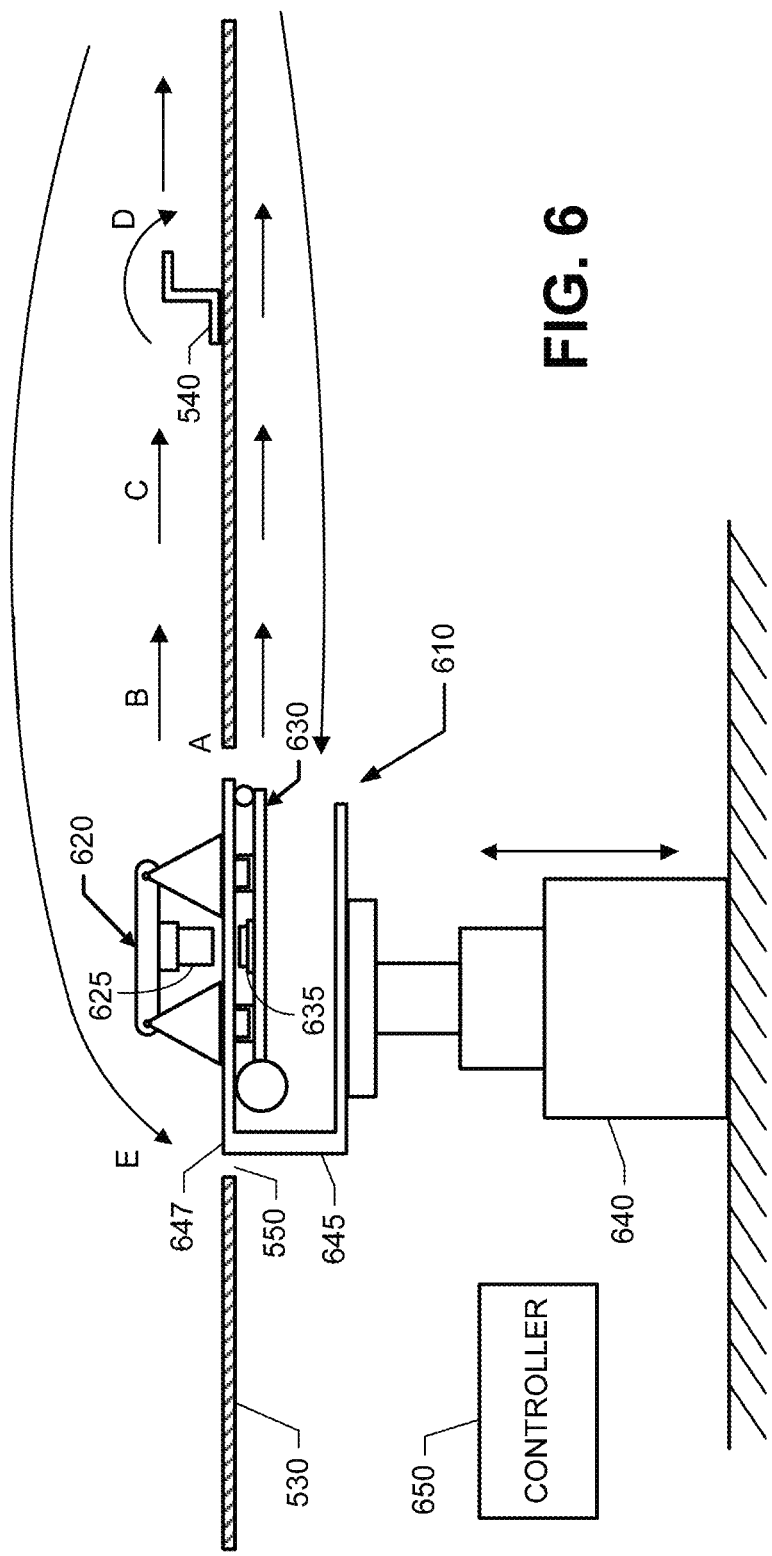
FIG. 6 is an illustration of a system including inner and outer robots for performing a manufacturing operation on the wing box.

Reference is now made to FIG. 6, which illustrates a system 610 including inner and outer robots 620 and 630 for performing fastening operations on a wing box (only the bottom skin panel 530 and a stringer 540 of the wing box are shown). The inner robot 620 carries an inner end effector 625 for performing fastener termination (e.g., sleeve and nut installation). The outer robot 630 carries an outer end effector 635 for performing drilling and fastener insertion at target locations on the wing box.

The inner robot 620 incorporates the robot 120 described above. The inner robot 620 may perform either the flipping function or the stepping function. One advantage of stepping over a stringer 540 in the manner shown in FIGS. 4a-4h (as opposed to flipping in the manner shown in FIGS. 3a-3p) is that the inner end effector 625 is always pointing downward. Moreover, stepping across the stringer 540 allows the inner robot 620 to operate within the limited height of the wing box. However, the flipping makes it easier to load the inner robot 620 into the wing box, as will be described below. The following description of FIG. 6 is made in connection with a stepping operation.

The outer robot 630 includes the drive 160 described above. Since the inner robot 620 only performs a stepping operation, the flux conductors need not be configured to slide along the chassis.

A clamping force is achieved by the magnets of the inner robot 620 and the flux conductors of the outer robot 630. An additional clamping force may be provided by configuring the end effectors 625 and 635 to be magnetically attracted (e.g., a steel plate on the inner end effector 625 and an electromagnet on the outer end effector 635).

A lifting platform 640 lifts the inner and outer robots 620 and 630 such that the inner robot 620 is inside the wing box and the outer robot 630 is outside of the wing box. Once lifted, the inner robot 620 is in a position to move over the interior surface of the panel 530, and the outer robot 630 is in a position to move over the exterior surface of the panel 530. For instance, the lifting platform 640 may include a C-shaped structure 645 having an upper member 647. The inner and outer robots 620 and 630 are clamped to the upper member 647, and the clamped robots 620 and 630 are lifted until the upper member 647 is co-planar with the skin panel 530.

Once lifted, the outer robot 630 moves onto the outer surface of the skin panel 530, while it pulls the inner robot 620 onto the interior surface of the skin panel 530 (A and B). The inner robot 620 holds the outer robot 630 against gravity. The robots 620 and 630 move along the panel 530 until the inner robot 620 encounters a stringer 540. The inner robot 620 steps over the stringer 540 while holding the outer robot 630 against gravity (C and D). After moving to all target locations and performing all fastening operations within the wing box, the inner and outer robots 620 and 630 return to the access port 550 and exit the wing box (E).

The inner robot 620 is pulled via flux by the outer robot 630 in any direction that the outer robot 630 moves. Thus, the inner robot 620 may be pulled in the direction of the arrows in FIG. 6 (e.g., across the stringer 540), and it may be pulled in a direction orthogonal to the arrows (e.g., pulled along the length of the stringer 540).

The inner and outer robots 620 and 630 may be controlled by an external controller 650. The controller 650 may communicate wirelessly with the inner robot 620. The inner and outer robots 620 and 630 may be controlled to perform the functions illustrated in FIG. 7.

Reference is now made to FIG. 7, which illustrates a method of manufacturing a wing box. At block 710, the wing box is pre-assembled. During pre-assembly, faying (i.e., overlapping) surfaces of wing box parts (e.g., spars, skin panels, and ribs) may be covered with sealant and pressed together. The sealant eliminates gaps between the faying surfaces to facilitate burr less drilling. The pressed-together parts of the wing box may then be fastened (temporarily or permanently) with instrumented fasteners disclosed in assignee's U.S. Pat. No. 7,937,817 issued May 10, 2011. In one embodiment, an instrumented fastener includes one or more light sources (e.g., light-emitting diodes) configured to produce light beacons in opposite directions. Information regarding the instrumented fastener (e.g., fastener number) may be encoded in the light beacons.

At block 720, the inner and outer robots 620 and 630 are paired and positioned on the lifting platform 640. At block 730, the platform 640 lifts the inner robot 620 through the access port 550 and into a wing bay of the wing box.

At block 740, the inner and outer robots 620 and 630 are automatically unloaded and moved until their inner and outer end effectors 625 and 635 are positioned over a target fastener location. The inner and outer robots 620 and 630 may use vision systems and the instrumented fasteners to position and orient the end effectors 625 and 635 as described in assignee's U.S. Ser. No. 12/117,153 filed May 8, 2008 (now U.S. Pat. No. 8,301,302), the specification of which is incorporated herein by reference. The light beacons are directed inside and outside the wing bay, so they can be sensed by the inner and outer robots 620 and 630.

At block 750, precise positioning of the end effectors 625 and 635 with respect to the target location is performed. In some embodiments, the outer robot's traction system alone can achieve the precise positioning. In other embodiments, additional means (e.g., Lorentz force actuators) may be used in addition to the traction system to achieve the precise positioning.

At block 760, with the inner and outer robots 620 and 630 clamped together and against the skin panel 530, the outer end effector 635 performs burr-less drilling at the target location. Countersinking may also be performed. The outer end effector 635 then inserts a fastener through the drilled hole.

At block 770, the inner end effector 625 terminates the end of the inserted fastener. For example, the inner end effector 625 installs a sleeve and nut onto the fastener.

If additional fastening operations are to be performed (block 780), the end effectors 625 and 635 are moved to a new target location and the operations at blocks 740-770 are repeated. The outer robot 630 may be turned to orient the inner robot 620 and it may be pulled to move the inner robot 620 towards a new target location.

After the last fastening operation in the wing bay has been performed (block 780), the inner and outer robots 620 and 630 are returned to the access port 550, and automatically loaded onto the lifting platform 640 (block 790). The inner robot 620 is lowered out of the wing bay (block 790), and the inner and outer robots 620 and 630 are moved to the access port of another wing bay (blocks 785 and 730). The operations at blocks 740-780 are repeated until fastening operations have been performed on each wing bay of the wing box (block 785).

A system and method herein may use an inner robot 620 that performs a flipping operation instead of a stepping operation. Using a flipping operation, the inner robot 620 can be automatically loaded into a wing bay as illustrated in FIGS. 8a-8d.

As shown in FIG. 8a, the inner and outer robots 620 and 630 are lifted up to the wing box by a lift platform 810 having a magnet bank 812 that is engaged with one bank of the inner robot's magnets. This allows the inner robot 620 to flip once it has been placed through the access port.

As shown in FIGS. 8b and 8c, the inner robot 620 flips to engage its magnets with the flux conductors of the outer robot 630. The magnet bank 812 of the lift platform 810 is then disengaged from the inner robot 620 (FIG. 8c). As shown in FIG. 8d, after the inner robot 620 completes a flip, the lift platform 810 is lowered. The inner robot 620 can be automatically unloaded from the wing bay by reversing the procedure illustrated in FIGS. 8a-8d.

Figure 9:
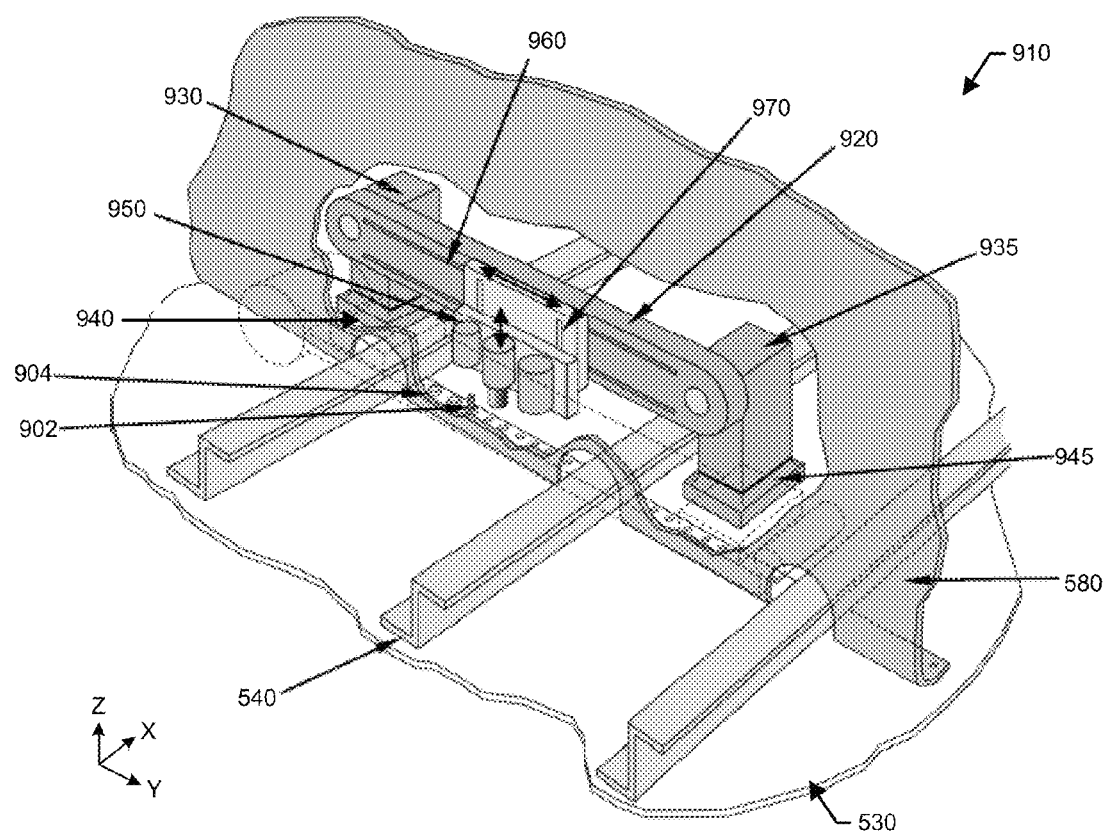
FIG. 9 is an illustration of an embodiment of the inner robot.

Reference is made to FIG. 9, which illustrates an embodiment of an inner robot 910 for performing fastener termination operations (the outer robot is outlined in phantom). The inner robot 910 includes a bridge 920 supported at opposite ends by first and second posts 930 and 935. The posts 930 and 935 are pivoted to the bridge 920. Each post 930 and 935 terminates in a magnet base 940 and 945.

Each magnet base 940 and 945 may include a Halbach array of rare earth permanent magnets. The Halbach array is a specific permanent magnet configuration that achieves maximum flux.

The inner robot 910 is shown fastening a rib web 580 to a skin panel 530. The bridge 920 carries a multi-function end effector 950 including a vision system and nut/sleeve installation tool. The end effector 950 is movable along Y and Z rails 960 and 970 in Y and Z directions for sleeve and nut installation tasks. The installation tool is moved over a fastener end 902, and a sleeve and nut 904 are placed over the fastener 902.

The inner robot 910 and the outer robot may also include Lorentz force actuators (not shown) for fine positioning. Two sets of coils and permanent magnets may be located on the inner robot 910 and the outer robot and are directed in such a way that driving forces are generated in both X and Y directions. The coils are preferably mounted on the outer robot and the permanent magnets are preferably installed on the inner robot 910 so the inner robot 910 remains passive. Running a current through a coil generates an equal and opposite Lorentz force between the inner robot 910 and the outer robot. The Lorentz force is controlled to precisely position the robots.

The inner robot 910 further includes an on-board controller (not shown) for controlling the inner robot 910 to operate the end effector, sense obstacles, determine when its end effector 950 is precisely positioned over a target, and communicate with an external controller. The external controller commands the movement of the outer robot, controls the current through the Lorentz actuators, etc.

A system herein replaces manual assembly tasks for wing boxes and other confined spaces. It can perform thousands of fastening operations much faster than manual labor. The system operates within the space constraints of a wing box. It satisfies extremely tight aircraft tolerances.

The robotic operation not only increases productivity, but it also reduces worker hardship. Manually installing nuts/sleeves inside the confined space of a wing box is ergonomically challenging.

A system herein is not limited to fastening operations that involve bolts and nuts. Other fastening operations involve, without limitation, riveting.

A system herein is not limited to fastening operations. A system herein may be used to perform other manufacturing operations such as sealant application, cleaning, painting and inspection.

A system herein is not limited to an aircraft. A system herein may be applied to containers, autos, trucks, ships, and other structures having confined spaces. For instance, inner and outer robots may be used to inspect the insides of cylinders that hold fluids.

The invention claimed is:

1. A system comprising:
    a driver robot having a body with a pair of spaced apart flux conductors;
    a follower robot having an articulated body with a first foot, a second foot, a first magnet at a base of the first foot, and a second magnet at a base of the second foot, the magnets coupled to the flux conductors when the articulated body is in an engaged position, one of the magnets decoupled from one of the flux conductors when the articulated body is in a flipping or stepping position;
    wherein the driver robot is capable of moving the follower robot along a surface when the articulated body of the follower robot is in the engaged position.

2. The system of claim 1, further comprising a controller for controlling the follower robot to flip after the one magnet has been decoupled.

3. The system of claim 1, further comprising a controller for controlling the follower robot to step after the one magnet has been decoupled.

4. The system of claim 1, further comprising a first controller for the driver robot and a second controller for the follower robot, the first controller causing the driver robot to move along the surface and pull the follower robot along the surface, the second controller causing the follower robot to sense obstacles on the surface, the first and second controllers communicating to enable the follower robot to decouple the one magnet from the driver robot, lift the decoupled magnet away from the panel and above a sensed obstacle, and move past the sensed obstacle.

5. The system of claim 4, wherein the second controller further causes the follower robot to lower the decoupled magnet back onto the surface after the obstacle has been avoided; and magnetically recouple the decoupled magnet to one of the flux conductors of the driver robot.

6. The system of claim 4, wherein the controllers communicate to cause the robots to decouple a far one of the magnets from the sensed obstacle, and the follower robot to flip so that the decoupled magnet moves past the sensed obstacle.

7. The system of claim 6, wherein the first and second flux conductors are slidable along the body in separate planes; and wherein the first controller causes the decoupled magnet to be recoupled by sliding the flux conductor further from the obstacle to displace the flux conductor closer to the obstacle, and then sliding the displaced conductor to recouple with the decoupled magnet.

8. The system of claim 4, wherein the controllers communicate to cause a near one of the magnets to the sensed obstacle to be decoupled and lifted above the sensed obstacle, and the driver robot to pull the follower robot so the decoupled magnet moves past the sensed obstacle.

9. The system of claim 1, wherein the flux conductors are mounted to a chassis via prismatic joints in offset planes that allow the flux conductors to pass each other without interference.

10. The system of claim 1, wherein the magnets apply force sufficient to hold the driver robot against gravity.

11. The system of claim 1, wherein the driver robot further has a traction drive for moving the flux conductors along a surface.

12. The system of claim 1, wherein both robots include Lorentz force actuators for fine positioning.

13. The system of claim 1, further comprising an end effector carried by the driver robot and configured to perform drilling and fastener insertion; and an end effector carried by the follower robot and configured to perform fastener termination.

14. The system of claim 13, further comprising a plurality of instrumented fasteners, the robots configured to use the instrumented fasteners for positioning the end effectors.

15. The system of claim 1, further comprising a lifting platform for lifting the robots while the robots are paired.

16. A method comprising using the system of claim 15 to automatically unload the follower robot onto a structure, including using the lifting platform to raise the robot to the structure, and commanding the follower robot to perform a flip or step off the platform and onto the structure.

17. The method of claim 16, wherein the surface is an inner surface of the structure; wherein the follower robot does a flip or step onto the inner surface of the structure, and wherein the driver robot moves along an outer surface of the structure while magnetically coupled to the follower robot.

18. The method of claim 17, wherein both the flip and the step include magnetically decoupling one of the magnets of the follower robot, moving the driver robot onto the outer surface, and moving the decoupled magnet onto the inner surface so it magnetically recoupled with the driver robot.

* * * * *